(12) United States Patent
Sumesaglam (10) Patent No.: US 8,031,763 B2
(45) Date of Patent: Oct. 4, 2011

(54) AUTOMATIC TUNING CIRCUIT FOR A CONTINUOUS-TIME EQUALIZER

(75) Inventor: Taner Sumesaglam, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 1309 days.

(21) Appl. No.: 11/648,340

(22) Filed: Dec. 28, 2006

(65) Prior Publication Data

US 2008/0159372 A1   Jul. 3, 2008

(51) Int. Cl.
  *H03K 5/159* (2006.01)
(52) U.S. Cl. .......................... 375/232; 381/103; 333/18
(58) Field of Classification Search .................. 375/229
  See application file for complete search history.

(56) References Cited

U.S. PATENT DOCUMENTS

| | | | | |
|---|---|---|---|---|
| 3,568,100 A * | 3/1971 | Tarbos | ........................... | 333/18 |
| 3,578,914 A * | 5/1971 | Simonelli | ..................... | 370/284 |
| 3,898,564 A * | 8/1975 | Waldhauer et al. | ........... | 375/214 |
| 3,919,714 A * | 11/1975 | Bingham | ...................... | 348/630 |
| 4,459,698 A * | 7/1984 | Yumoto et al. | ................ | 375/236 |
| 5,568,465 A * | 10/1996 | Hutchins et al. | ........... | 369/59.15 |
| 6,137,832 A * | 10/2000 | Lin et al. | ....................... | 375/232 |
| 6,188,721 B1 * | 2/2001 | Shirani et al. | ................. | 375/232 |
| 6,489,838 B1 * | 12/2002 | Tsinker | ......................... | 327/557 |
| 6,643,324 B1 * | 11/2003 | Gasparik | ....................... | 375/229 |
| 6,836,185 B1 * | 12/2004 | Pobanz | ......................... | 330/260 |
| 6,838,943 B2 * | 1/2005 | Zamir et al. | ................... | 330/304 |
| 6,850,559 B1 * | 2/2005 | Driessen et al. | ............... | 375/219 |
| 7,047,556 B2 * | 5/2006 | Cole et al. | ...................... | 725/149 |
| 7,058,150 B2 * | 6/2006 | Buchwald et al. | ............ | 375/355 |
| 7,081,796 B2 * | 7/2006 | Krone | ........................... | 330/254 |
| 7,154,945 B2 * | 12/2006 | Guinea et al. | .................. | 375/229 |
| 7,212,070 B2 * | 5/2007 | Westwick et al. | ............... | 330/98 |
| 7,230,989 B2 * | 6/2007 | Biman et al. | ................... | 375/259 |
| 7,233,199 B2 * | 6/2007 | Westwick et al. | ............... | 330/85 |
| 7,245,187 B2 * | 7/2007 | Khajehpour | ................... | 330/305 |
| 7,324,167 B2 * | 1/2008 | Miller | ........................... | 348/723 |
| 7,345,988 B2 * | 3/2008 | Gorecki et al. | ............... | 370/201 |
| 7,362,153 B2 * | 4/2008 | Sumesaglam | ................. | 327/202 |
| 7,394,331 B2 * | 7/2008 | Yeung et al. | ................. | 333/28 R |
| 7,408,993 B2 * | 8/2008 | Webster | ......................... | 375/257 |
| 7,411,422 B2 * | 8/2008 | Clements et al. | ............... | 326/86 |
| 7,450,636 B2 * | 11/2008 | Lee et al. | ....................... | 375/232 |
| 7,457,605 B2 * | 11/2008 | Thompson et al. | ........... | 455/313 |
| 7,502,326 B2 * | 3/2009 | Evans | ........................... | 370/241 |
| 2004/0001541 A1 * | 1/2004 | Haghighat | ..................... | 375/232 |
| 2005/0058222 A1 * | 3/2005 | Black et al. | ................... | 375/316 |
| 2005/0201454 A1 * | 9/2005 | Chaudhuri et al. | ........... | 375/229 |
| 2006/0088086 A1 * | 4/2006 | Gondi et al. | .................. | 375/229 |
| 2006/0098727 A1 * | 5/2006 | Kuijk | ............................. | 375/232 |
| 2006/0140262 A1 * | 6/2006 | Kuijk et al. | ................... | 375/232 |

(Continued)

OTHER PUBLICATIONS

Pending U.S. Appl. No. 11/240,584, filed Sep. 29, 2005 (inventor: Sumesaglam et al.).

*Primary Examiner* — Chieh M Fan
*Assistant Examiner* — Santiago Garcia
(74) *Attorney, Agent, or Firm* — Caven & Aghevli LLC (57) ABSTRACT

Embodiments of the invention are generally directed to systems, methods, and apparatuses for an automatic tuning circuit for a continuous-time equalizer (CTE). In some embodiments, the automatic tuning circuit automatically tunes the magnitude response as a function of frequency of the CTE.

14 Claims, 6 Drawing Sheets

U.S. PATENT DOCUMENTS

| | | | |
|---|---|---|---|
| 2006/0227917 A1* | 10/2006 | Buchwald et al. | 375/355 |
| 2006/0245485 A1* | 11/2006 | Martin et al. | 375/229 |
| 2006/0268167 A1* | 11/2006 | Cole et al. | 348/398.1 |
| 2007/0072568 A1* | 3/2007 | Sumesaglam et al. | 455/230 |
| 2007/0201546 A1* | 8/2007 | Lee | 375/229 |
| 2008/0049883 A1* | 2/2008 | Sumesaglam et al. | 375/362 |
| 2008/0159372 A1* | 7/2008 | Sumesaglam | 375/232 |
| 2008/0304557 A1* | 12/2008 | Hollis | 375/231 |

* cited by examiner

AUTOMATIC TUNING CIRCUIT FOR A CONTINUOUS-TIME EQUALIZER

TECHNICAL FIELD

Embodiments of the invention generally relate to the field of integrated circuits and, more particularly, to systems, methods and apparatuses for an automatic tuning circuit for a continuous-time equalizer.

BACKGROUND

Multi-gigibit chip-to-chip interconnect channels can be very lossy. For example, they may attenuate high frequency signals more than low frequency signals. This frequency dependent difference in signal attenuation can complicate the recovery of received data and can limit the maximum speed of data transfer.

Conventional systems frequently use transmit pre-emphasis and/or receive continuous-time equalization (CTE) to mitigate signal attenuation on a lossy channel. As data transfer rates increase, the power consumed by these conventional methods also increases. Thus, in conventional systems, more and more power is being consumed to achieve a target bit-error rate (BER).

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for an automatic tuning circuit for a continuous-time equalizer (CTE). In some embodiments, the automatic tuning circuit increases the effectiveness of receive side equalization. In addition, the automatic tuning circuit may also enable power reduction on the transmit side by correcting for CTE and process/voltage/temperature (PVT) variations. As is further described below, when enabled, the circuit moves a pole and/or a zero of an associated CTE circuit to equalize a lossy channel for ISI.

Figure 1:
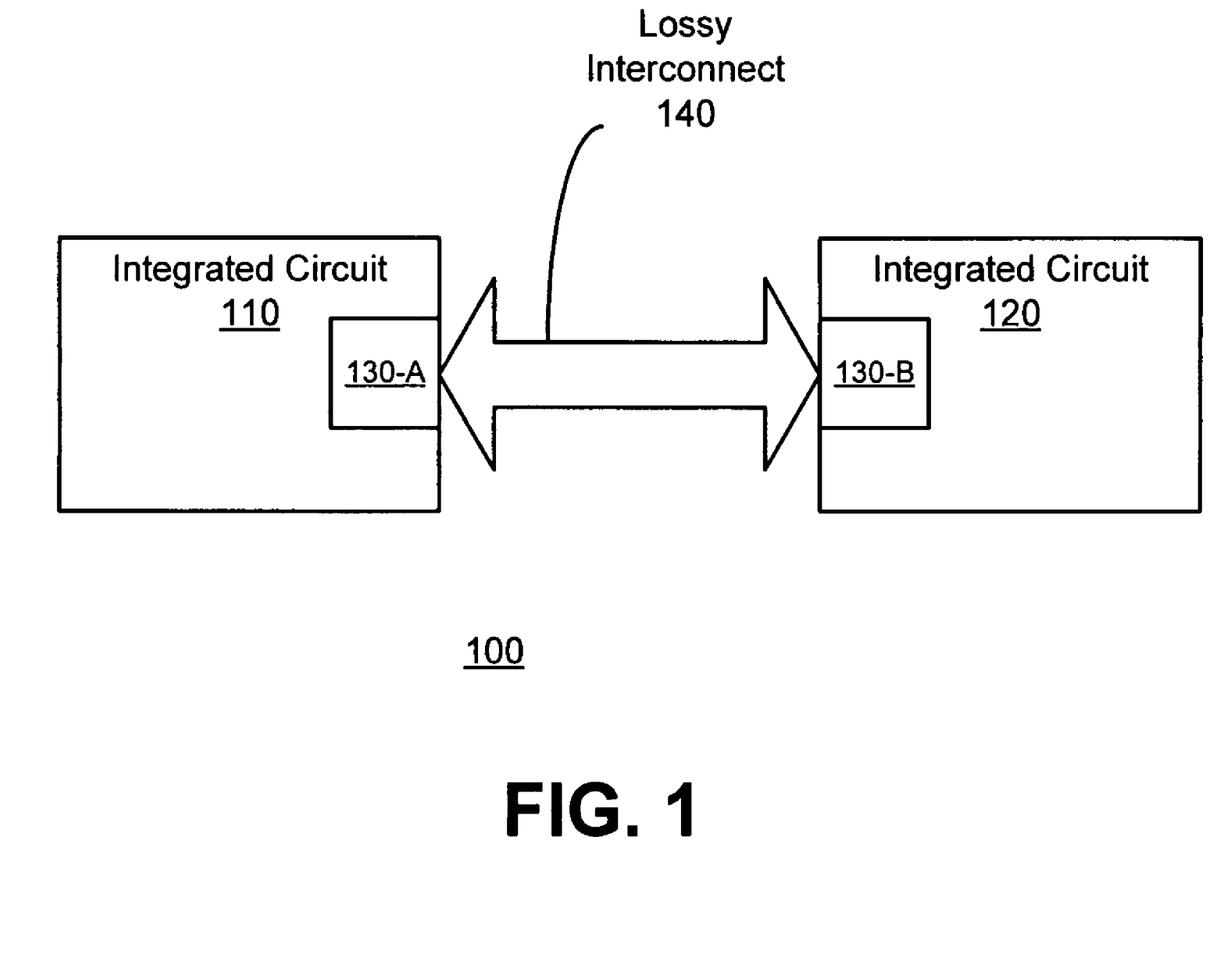
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. Computing system 100 includes integrated circuits 110 and 120 coupled together through lossy interconnect 140. In some embodiments, integrated circuit 110 is memory controller and integrated circuit 120 is a memory device (e.g., a dynamic random access memory (DRAM)). In such embodiments, lossy interconnect 140 may be a memory interconnect.

Integrated circuits 110 and 120 each include interface 130. Interface 130 may include one or more transmitters (TXs) and receivers (RXs) as well as other circuits (e.g., buffers, clock circuits, etc.). At least one of the RXs may include a continuous-time equalizer (CTE) to reduce the ISI for data received from lossy interconnect 140.

In some embodiments, a digital automatic tuning circuit is coupled with the CTE. The automatic tuning circuit is capable of altering a magnitude response (as a function of frequency) of the CTE. As is further described below with reference to FIGS. 2-6, the tuning circuit can reduce ISI for signals received from lossy channel 140 by altering the magnitude response of the CTE.

Figure 2:
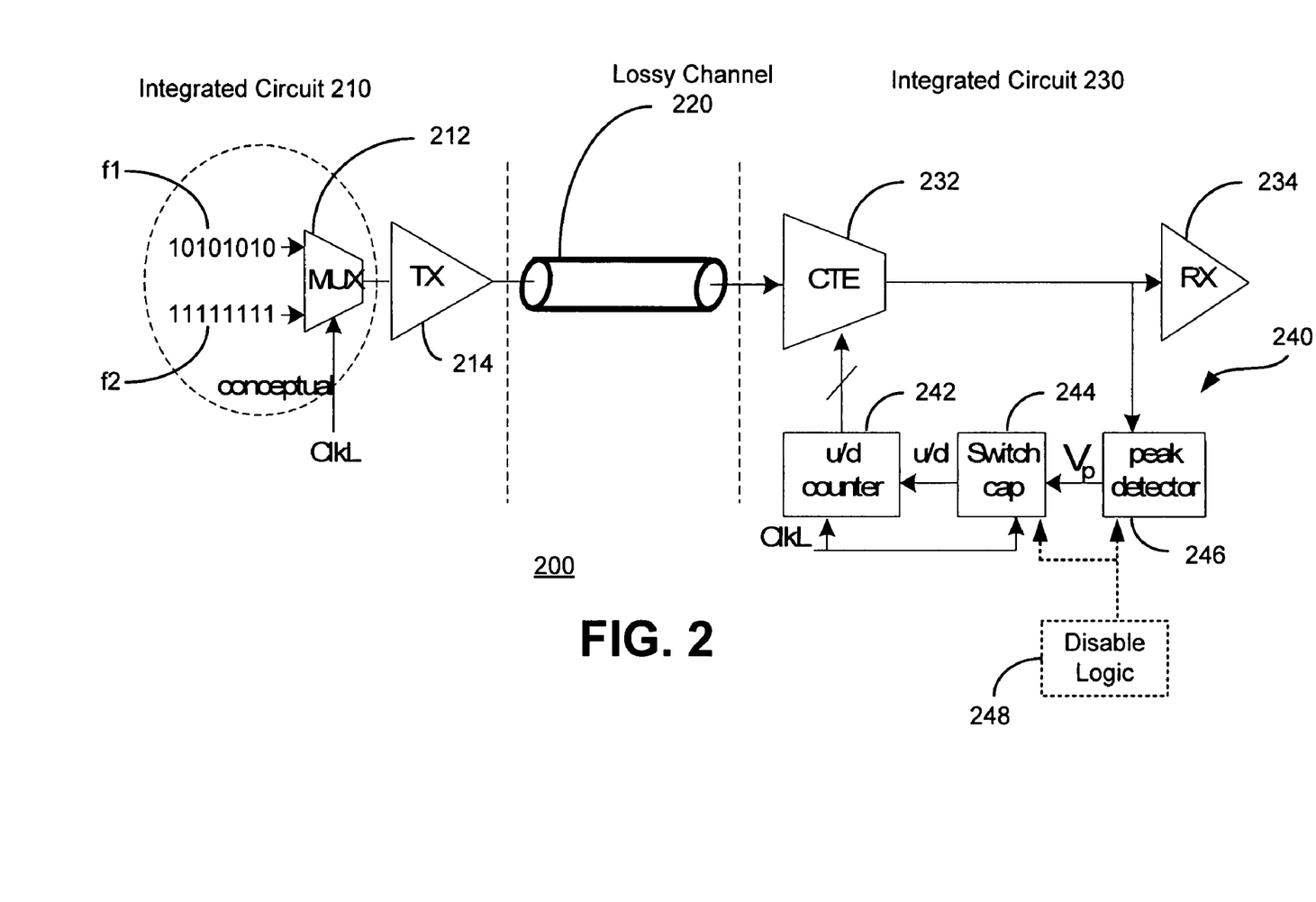
FIG. 2 is a block diagram illustrating selected aspects of a computing system implemented according to an embodiment of the invention.

FIG. 2 is a block diagram illustrating selected aspects of a computing system implemented according to an embodiment of the invention. Computing system 200 includes integrated circuits 210 and 230 coupled together by lossy channel 220. Integrated circuits (ICs) 210 and 230 may be any of a wide array of ICs including, for example, memory controllers, DRAMs, advanced memory buffers, and the like. Lossy channel 220 may be nearly any lossy interconnect including, for example, a memory bus (such as a double data rate (DDR) bus).

Integrated circuit 210 includes transmitter 214 to transmit data (at an appropriate data rate) over lossy channel 220. In some embodiments, integrated circuit 210 (or simply, chip 210) sends alternating data (f1) at a target rate or steady/constant data (f2) to chip 230 (e.g., a constant stream of logical 1's or a constant stream of logical 0's). In some embodiments, f1 has more high frequency content than f2 and f2 has more (or only) low frequency content. A signal such as ClkL may be used to select which signal is transmitted by chip 210. For example, while ClkL is low, multiplexer 212 may pass f1 and while ClkL is high, multiplexer 212 may pass f2.

Chip 230 receives the signal (e.g., either f1 or f2) from lossy channel 220. CTE 232 provides continuous-time equalization for the received signal. In some embodiments, digital automatic tuning circuit 240 is coupled with CTE 232. For example, the output of CTE 232 may provide an input to tuning circuit 240 and an output of tuning circuit 240 may provide an input to CTE 232. In some embodiments, tuning circuit 240 includes peak detector 246, switch capacitor 244, and up/down counter 242. In alternative embodiments, tuning circuit 240 may include more elements, fewer elements, and/or different elements.

Peak detector 246 receives the data signal from CTE 232 and generates a voltage Vp. Voltage Vp is proportional to the magnitude of the data signal. Ideally, when lossy channel 220 is equalized Vp is the same for signals having different data rates (e.g., the same for f1 and f2). Due to PVT variation, however, it is possible that CTE 232 is not in the optimum operating point. That is, it is possible that a pole/zero of CTE 232 has deviated from an ideal location.

Switch capacitor 244 samples and holds Vp values for f1 and f2 (e.g., at the rising edge of ClkL). As is further described below, with reference to FIG. 5, switch capacitor 244 compares the Vp values for f1 and f2 and, based on the comparison, generates an up or down signal for up/down counter 242.

Up/down counter 242 receives the up or down signal from switch capacitor 242 and generates a control signal for CTE 232. In some embodiments, the control signal is a multi-bit "capacitor code" that determines a number of active capacitors in a switching series of capacitors. As is further described below, with reference to FIG. 3, the location of the pole/zero of CTE 232 is determined by the number of active capacitors. Table 1 illustrates the tuning process according to an illustrative embodiment of the invention. M(f1) refers to the magnitude of CTE output with f1 and M(f2) refers to the magnitude of CTE output with f2. It is to be appreciated that in alternative embodiments, the tuning process may be different.

TABLE 1

| CONDITION | TUNING ACTION |
| --- | --- |
| M(f1) > M2(f2) | move zero/pole to higher frequency |
| M(f1) < M2(f2) | move zero/pole to lower frequency |
| M(f1) = M2(f2) | Tuned |

In some embodiments, the tuning process is performed as part of a training sequence for lossy channel 220. The training sequence may be performed periodically and/or in response to certain events. For example, on initiation, chips 210 and 230 may perform handshaking to determine when f1 and f2 are going to be transmitted. Subsequently, chip 210 may transmit f1 and f2 and tuning circuit 240 may tune CTE 232. In some embodiments, disable logic 248 may disable tuning circuit 240 after CTE 232 is tuned.

In alternative embodiments, there are additional channels connecting chips 210 and 230. In such embodiments, some channels may be allocated for tuning and some may be allocated for normal operation. For example, tuning circuit 240 may generate a control signal for CTE 232 on a first channel. The control signal may then be copied to CTEs in the channels allocated for normal operation. In such embodiments, tuning circuit 240 may operate continuously.

Figure 3:
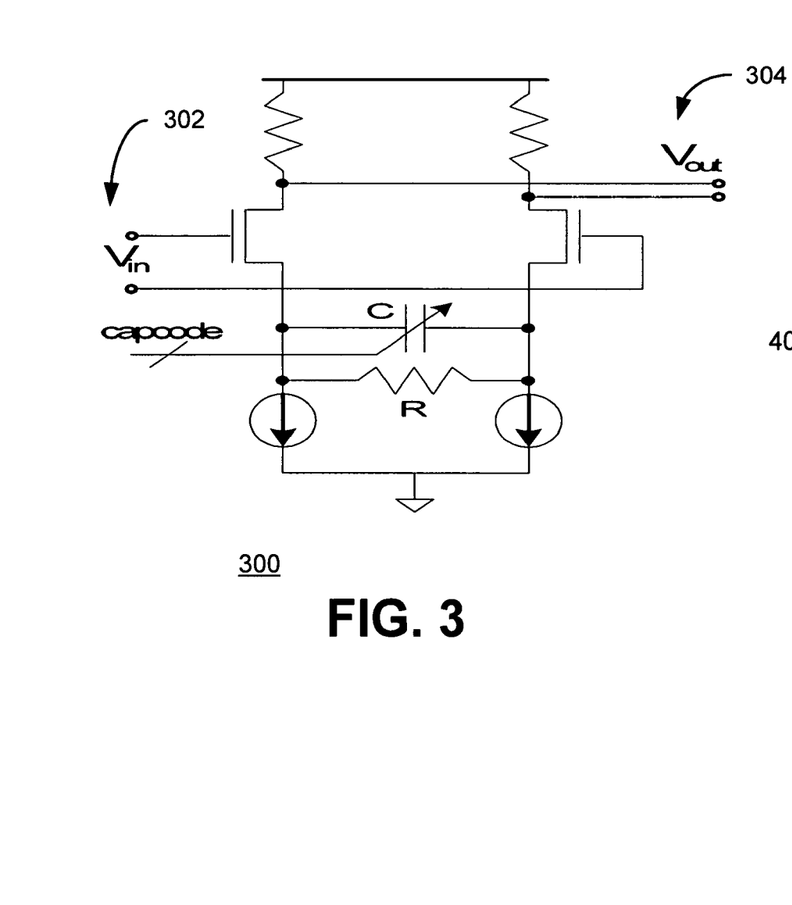
FIG. 3 is a circuit diagram illustrating selected aspects of a continuous-time equalizer according to an embodiment of the invention.

FIG. 3 is a circuit diagram illustrating selected aspects of a continuous-time equalizer according to an embodiment of the invention. CTE 300 receives a differential input from a lossy channel (e.g., lossy channel 220, shown in FIG. 2) and provides a differential output 304 to a receiver and a tuning circuit (e.g., tuning circuit 240, shown in FIG. 2). In some embodiments, C is a number of capacitors in a switching series. The switching series of capacitors C determine the location a pole/zero of CTE 300 and, thereby, determine the magnitude response of CTE 300. In alternative embodiments, CTE 300 may have more elements, fewer elements, and/or different elements.

In some embodiments, the capcode is a control signal provided by the tuning circuit. The capcode determines how many capacitors in C are active (or on). The capcode may be a number of control bits each corresponding to one of the capacitors in C. In some embodiments, if the up/down counter in the tuning circuit is increasing, then the number of capacitors that are active in C is also increasing. This increases the total capacitance of C. Similarly, if the up/down counter is decreasing, then the number of capacitors that are active in C is also decreasing. This decreases the total capacitance of C. As the capacitance of C changes, the pole/zero of CTE 300 shifts. The shifting of the pole/zero alters the high frequency gain of CTE 300.

Figure 4:
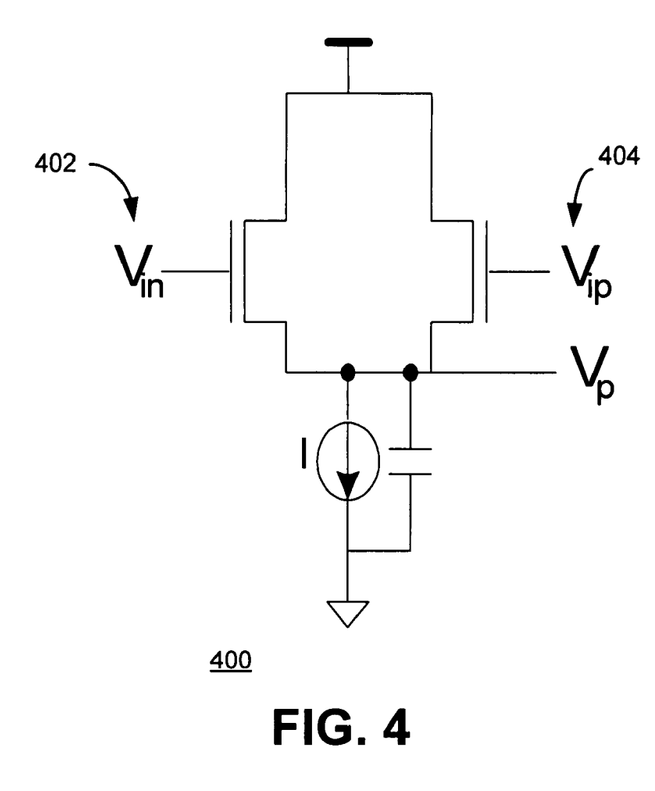
FIG. 4 is a circuit diagram illustrating selected aspects of a peak detector according to an embodiment of the invention.

FIG. 4 is a circuit diagram illustrating selected aspects of a peak detector according to an embodiment of the invention. In some embodiments, the input (402) to peak detector 400 is a differential signal provided by the CTE. The output (404) of peak detector 400, Vp, is a voltage that is proportional to the envelope of the output of the CTE. In alternative embodiments, peak detector 400 may have more elements, fewer elements, and/or different elements.

Figure 5:
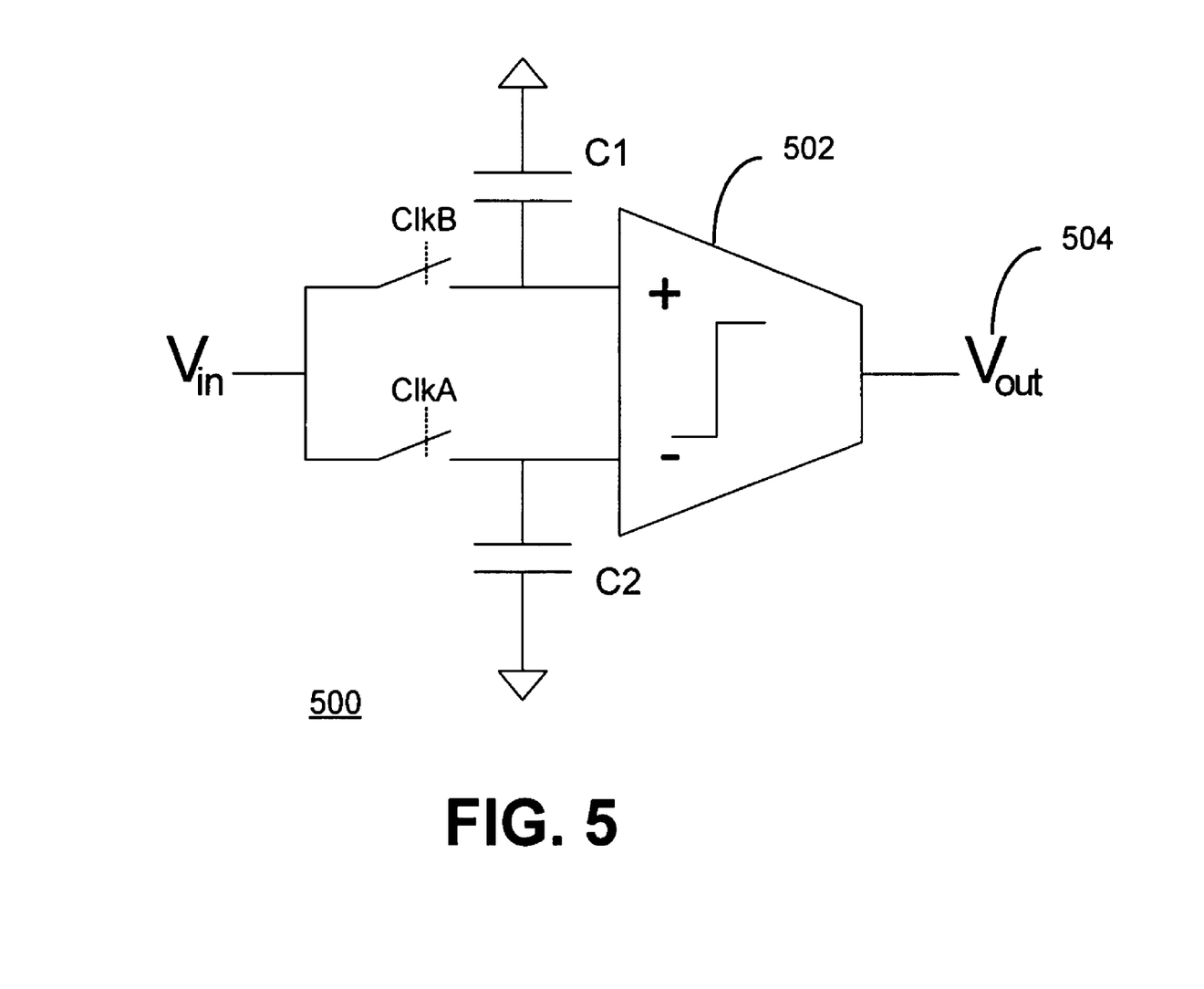
FIG. 5 is a circuit diagram illustrating selected aspects of a switch capacitor according to an embodiment of the invention.

FIG. 5 is a circuit diagram illustrating selected aspects of a switch capacitor according to an embodiment of the invention. In some embodiments, switch capacitor 500 includes two capacitors (e.g., C1 and C2) and comparator 502. The input to switch capacitor 500 is the voltage Vp provided by the peak detector. The voltage Vp may correspond to f1 (e.g., M(f1)) or it may correspond to f2 (e.g., M(f2)) depending on which signal the transmitting chip is sending. Switch capacitor 500 stores M(f1) in one capacitor (e.g., C1) and M(f2) in the other capacitor (e.g., C2). A clocking signal (e.g., ClkA and ClkB) determines which capacitor stores which value. Comparator 502 generates a full swing voltage, either high or low, depending on which stored value is greater. Thus, output 504 is a high or a low value that provides an up/down signal to an up/down counter.

Figure 6:
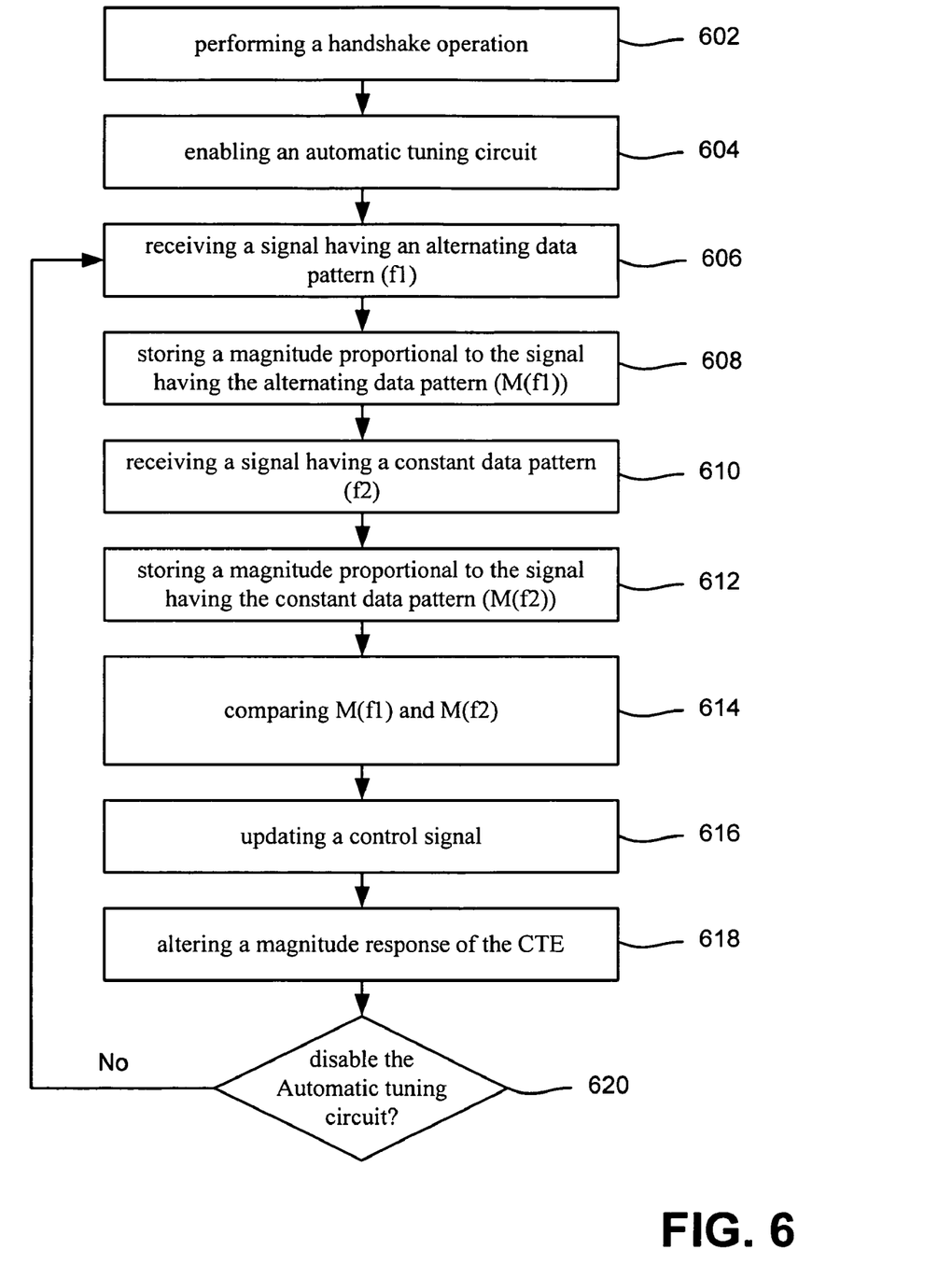
FIG. 6 is a flow diagram illustrating selected aspects of a method for automatically tuning a continuous-time equalizer according to an embodiment of the invention.

FIG. 6 is a flow diagram illustrating selected aspects of a method for automatically tuning a continuous-time equalizer according to an embodiment of the invention. Referring to process block 602, the interfaces for two chips (e.g., chips 210 and 230, shown in FIG. 2) perform a handshake operation. In some embodiments, the handshake operation is used to determine when a transmitting chip will send a signal having an alternating data pattern and when it will send a signal having a constant data pattern. As used herein, a signal having an alternating data pattern refers to a signal having a target data rate and that transitions between logical highs and logical lows. A signal having a constant data pattern refers to a signal that does not transition between a logical high and a logical low. In some embodiments, the signal having the alternating data pattern may have more high frequency content than the signal having the constant data pattern. An automatic tuning circuit is enabled at 604.

The receiving chip receives the signal having the alternating data pattern (f1) at 606. In some embodiments, a peak detector generates a voltage, M(f1), proportional to the magnitude of f1 and stores M(f1) in, for example, a switch capacitor at 608. The receiving chip also receives a signal having a constant data pattern (f2) at 610 and generates a voltage, M(f2), proportional to the magnitude of f2. M(f2) is stored in, for example, in a switch capacitor at 612.

Referring to 614, M(f1) and M(f2) are compared to determine which value is larger. A control signal is updated (616) based, at least in part, on which value is larger. In some embodiments, the control signal is a number of control bits provided by an up/down counter (e.g., up/down counter 242, shown in FIG. 2). The magnitude response of the associated CTE is altered based, at least in part, on the control signal (618). In some embodiments, the tuning circuit is disabled after the CTE is tuned (620).

Figure 7:
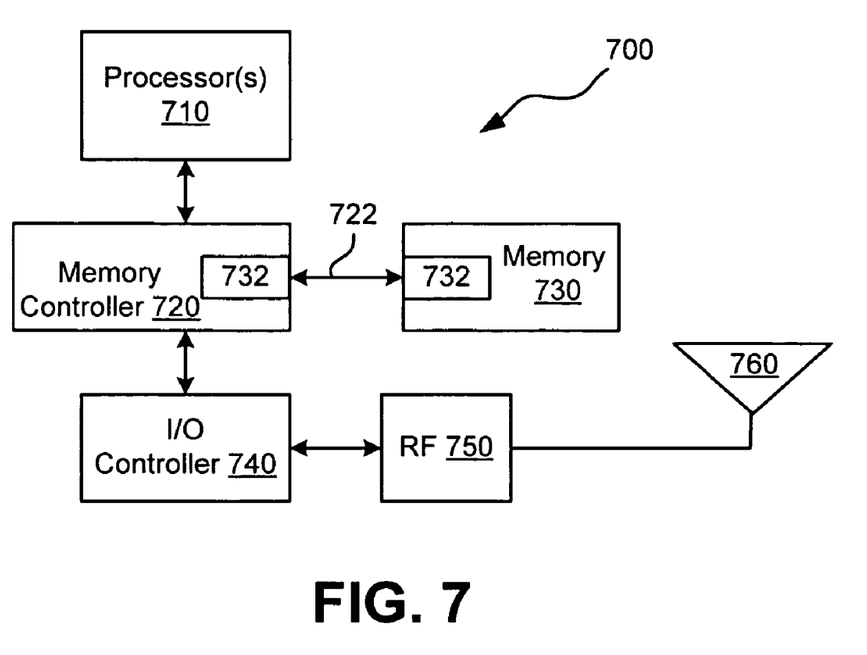
FIG. 7 is a block diagram illustrating selected aspects of an electronic system, according to an embodiment of the invention.

FIG. 7 is a block diagram illustrating selected aspects of an electronic system according to an embodiment of the invention. Electronic system 700 includes processor 710, memory controller 720, memory 730, input/output (I/O) controller 740, radio frequency (RF) circuits 750, and antenna 760. In operation, system 700 sends and receives signals using antenna 760, and these signals are processed by the various elements shown in FIG. 7. Antenna 760 may be a directional antenna or an omni-directional antenna. As used herein, the term omni-directional antenna refers to any antenna having a substantially uniform pattern in at least one plane. For example, in some embodiments, antenna 760 may be an omni-directional antenna such as a dipole antenna or a quarter wave antenna. Also, for example, in some embodiments, antenna 760 may be a directional antenna such as a parabolic dish antenna, a patch antenna, or a Yagi antenna. In some embodiments, antenna 760 may include multiple physical antennas.

Radio frequency circuit 750 communicates with antenna 760 and I/O controller 740. In some embodiments, RF circuit 750 includes a physical interface (PHY) corresponding to a communication protocol. For example, RF circuit 750 may include modulators, demodulators, mixers, frequency synthesizers, low noise amplifiers, power amplifiers, and the like. In some embodiments, RF circuit 750 may include a heterodyne receiver, and in other embodiments, RF circuit 750 may include a direct conversion receiver. For example, in embodiments with multiple antennas 760, each antenna may be coupled to a corresponding receiver. In operation, RF circuit 750 receives communications signals from antenna 760 and provides analog or digital signals to I/O controller 740. Further, I/O controller 740 may provide signals to RF circuit 750, which operates on the signals and then transmits them to antenna 760.

Processor(s) 710 may be any type of processing device. For example, processor 710 may be a microprocessor, a microcontroller, or the like. Further, processor 710 may include any number of processing cores or may include any number of separate processors.

Memory controller 720 provides a communication path between processor 710 and other elements shown in FIG. 7. In some embodiments, memory controller 720 is part of a hub device that provides other functions as well. As shown in FIG. 7, memory controller 720 is coupled to processor(s) 710, I/O controller 740, and memory 730.

Memory 730 may include multiple memory devices. These memory devices may be based on any type of memory technology. For example, memory 730 may be random access memory (RAM), dynamic random access memory (DRAM), static random access memory (SRAM), nonvolatile memory such as FLASH memory, or any other type of memory.

Memory 730 may represent a single memory device or a number of memory devices on one or more modules. Memory controller 720 provides data through interconnect 722 to memory 730 and receives data from memory 730 in response to read requests. Commands and/or addresses may be provided to memory 730 through interconnect 722 or through a different interconnect (not shown). Memory controller 730 may receive data to be stored in memory 730 from processor 710 or from another source. Memory controller 730 may provide the data it receives from memory 730 to processor 710 or to another destination. Interconnect 722 may be a bi-directional interconnect or a unidirectional interconnect. Interconnect 722 may include a number of parallel conductors. The signals may be differential or single ended. In some embodiments, interconnect 722 operates using a forwarded, multiphase clock scheme.

In some embodiments, memory controller 720 and/or memory 730 includes interface 732. Interface 732 includes a digital automatic tuning circuit to tune an associated CTE. In some embodiments, the tuning circuit moves a pole/zero of the CTE to equalize a lossy channel for ISI.

Memory controller 720 is also coupled to I/O controller 740 and provides a communications path between processor (s) 710 and I/O controller 740. I/O controller 740 includes circuitry for communicating with I/O circuits such as serial ports, parallel ports, universal serial bus (USB) ports and the like. As shown in FIG. 7, I/O controller 740 provides a communication path to RF circuits 750.

Figure 8:
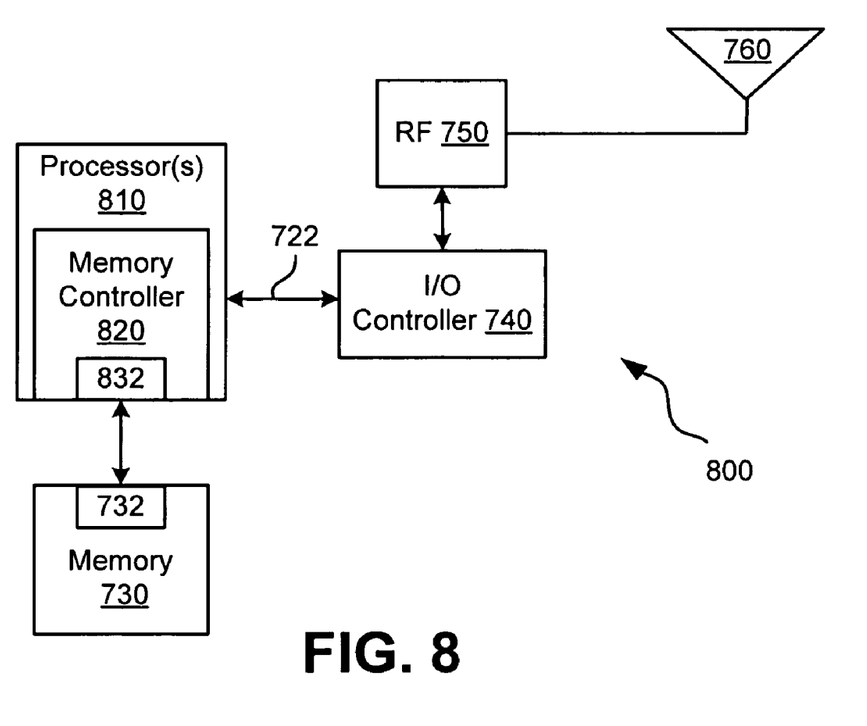
FIG. 8 is a bock diagram illustrating selected aspects of an electronic system, according to an embodiment of the invention.

FIG. 8 is a bock diagram illustrating selected aspects of an electronic system according to an embodiment of the invention. Electronic system 800 includes memory 730, I/O controller 740, RF circuits 750, and antenna 760, all of which are described above with reference to FIG. 7. Electronic system 800 also includes processor(s) 810 and memory controller 820. As shown in FIG. 8, memory controller 820 may be on the same die as processor(s) 810. In some embodiments, memory controller 820 includes a thermal management system to collect and process temperature data from on-die thermal sensors in memory 730. Processor(s) 810 may be any type of processor as described above with reference to processor 710 (FIG. 5). In some embodiments, memory controller 820 includes interface 832. Interface 832 includes a digital automatic tuning circuit to tune an associated CTE. In some embodiments, the tuning circuit moves a pole/zero of the CTE to equalize a lossy channel for ISI. Example systems represented by FIGS. 7 and 8 include desktop computers, laptop computers, servers, cellular phones, personal digital assistants, digital home systems, and the like.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
a continuous-time equalizer (CTE) to receive an input from a lossy channel and to provide an output; and an automatic tuning circuit coupled with the CTE, the automatic tuning circuit capable of altering a magnitude response of the CTE, wherein the magnitude response is a function of a frequency of a signal received from the lossy channel, wherein the automatic tuning circuit is to comprise: a peak detector to receive the output of the CTE and to generate a voltage that is proportional to a magnitude of the output of the CTE and an up/down counter to receive an up/down signal and to provide a control signal to the CTE, wherein the control signal is to indicate a number of active capacitors in a switching series, wherein the peak detector is to receive a signal having a target data rate and a signal having a constant data pattern and wherein the peak detector is to provide: a magnitude ($M(f1)$) proportional to the signal having the target data rate; and a magnitude ($M2(f2)$) proportional to the signal having the constant data pattern.

2. The integrated circuit of claim 1, wherein altering the magnitude response of the CTE comprises:
moving a pole or a zero of the magnitude response of the CTE.

3. The integrated circuit of claim 2, wherein moving a pole or a zero of the magnitude response of the CTE comprises:
determining a magnitude of a signal having an alternating data pattern at a target rate ($M(f1)$); and
determining a magnitude of a signal having a constant data pattern ($M2(f2)$).

4. The integrated circuit of claim 3, wherein moving a pole or a zero of the magnitude response of the CTE further comprises:
moving a pole or a zero of the magnitude response of the receiver to a higher frequency if $M(f1)>M2(f2)$; and
moving a pole or a zero of the magnitude response of the receiver to a lower frequency, if $M(f1)<M2(f2)$.

5. The integrated circuit of claim 1, wherein the automatic tuning circuit further comprises:
a switch capacitor to receive and compare $M(f1)$ and $M2(f2)$ and to generate the up/down signal based, at least in part on a comparison of $M(f1)$ and $M2(f2)$.

6. The integrated circuit of claim 1, further comprising:
disable logic to disable the automatic tuning circuit.

7. A system comprising:
a first integrated circuit having a transmitter to transmit a data signal;
a lossy channel; and
a second integrated circuit coupled with the first integrated circuit via the lossy channel, the second integrated circuit including,
a continuous-time equalizer (CTE) to receive the data signal and to provide an output to a receiver; and
an automatic tuning circuit coupled with the CTE, the automatic tuning circuit capable of altering a magnitude response of the CTE, wherein the magnitude response is a function of a frequency of the data signal, wherein altering the magnitude response of the CTE is to comprise moving a pole or a zero of the magnitude response of the CTE, wherein the first integrated circuit having the transmitter to transmit the data signal is to comprise a first integrated circuit having a transmitter to transmit a signal having a target data rate (f1) and a signal having a constant data pattern (f2), and wherein the automatic tuning circuit is to comprise an up/down counter to receive the up/down signal and to provide a control signal to the CTE, wherein the control signal determines a number of active capacitors in a switching series.

8. The system of claim 7, wherein moving a pole or a zero of the magnitude response of the CTE comprises:
determining a magnitude proportional to the signal having a target data rate ($M(f1)$); and determining a magnitude proportional to the signal having a constant data pattern ($M2(f2)$).

9. The system of claim 8, wherein moving a pole or a zero of the magnitude response of the CTE further comprises:
moving a pole or a zero of the magnitude response of the CTE to a higher frequency if $M(f1)>M2(f2)$; and
moving a pole or a zero of the magnitude response of the CTE to a lower frequency if $M(f1)<M2(f2)$.

10. The system of claim 7, wherein the automatic tuning circuit comprises:
a peak detector to receive the output of the CTE and to generate a voltage that is proportional to a magnitude of the output of the CTE.

11. The system of claim 10, wherein the peak detector is to receive f1 and f2.

12. The system of claim 11, wherein the peak detector is to provide:
a magnitude proportional to the signal having a target data rate ($M(f1)$); and
a magnitude proportional to the signal having a constant data pattern ($M2(f2)$).

13. The system of claim 12, wherein the automatic tuning circuit further comprises:
a switch capacitor to receive and compare $M(f1)$ and $M2(f2)$ and to generate an up/down signal based, at least in part on a comparison of $M(f1)$ and $M2(f2)$.

14. The system of claim 7, wherein the automatic tuning circuit comprises:
disable logic to disable the automatic tuning circuit.

* * * * *

UNITED STATES PATENT AND TRADEMARK OFFICE
CERTIFICATE OF CORRECTION

PATENT NO. : 8,031,763 B2  Page 1 of 1
APPLICATION NO. : 11/648340
DATED : October 4, 2011
INVENTOR(S) : Taner Sumesaglam It is certified that error appears in the above-identified patent and that said Letters Patent is hereby corrected as shown below:

In column 7, line 34, in claim 4, delete "frequency," and insert -- frequency --, therefor.

Signed and Sealed this
Sixth Day of March, 2012

David J. Kappos
*Director of the United States Patent and Trademark Office*